United States Patent
Sims, III et al.

(10) Patent No.: US 9,015,059 B2
(45) Date of Patent: Apr. 21, 2015

(54) WIRELESS SYSTEM FOR AUTOMATIC ORDERING OF MAINTENANCE PARTS FOR EQUIPMENT

(75) Inventors: Loyie H. Sims, III, Valley Center, CA (US); Satish N. Ram, Poway, CA (US); Robert D. McCloskey, Lawrenceville, GA (US)

(73) Assignee: Omnitracs, LLC, Dallas, TX (US)

( * ) Notice: Subject to any disclaimer, the term of this patent is extended or adjusted under 35 U.S.C. 154(b) by 2235 days.

(21) Appl. No.: 11/230,759

(22) Filed: Sep. 19, 2005

(65) Prior Publication Data

US 2007/0072547 A1    Mar. 29, 2007

(51) Int. Cl.
G06Q 10/00    (2012.01)
G05B 23/02    (2006.01)
G05B 19/418   (2006.01)
G06Q 10/08    (2012.01)

(52) U.S. Cl.
CPC ........ *G05B 23/0283* (2013.01); *G05B 19/4184* (2013.01); *G05B 2219/32229* (2013.01); *G05B 2219/32235* (2013.01); *G05B 2219/32236* (2013.01); *G06Q 10/087* (2013.01)

(58) Field of Classification Search
USPC ................................. 705/7.11–7.42
See application file for complete search history.

(56) References Cited

U.S. PATENT DOCUMENTS

| | | | |
|---|---|---|---|
| 5,361,199 A * | 11/1994 | Shoquist et al. | 705/26.62 |
| 5,737,728 A * | 4/1998 | Sisley et al. | 705/7.16 |
| 6,192,325 B1 * | 2/2001 | Piety et al. | 702/184 |
| 6,246,325 B1 * | 6/2001 | Chittipeddi | 340/540 |
| 6,292,724 B1 * | 9/2001 | Apsell et al. | 701/29.3 |
| 6,343,251 B1 * | 1/2002 | Herron et al. | 701/100 |
| 6,651,001 B2 * | 11/2003 | Apsell | 701/29.3 |
| 6,738,748 B2 * | 5/2004 | Wetzer | 705/7.21 |
| 6,803,861 B2 * | 10/2004 | Flick | 340/989 |
| 6,809,292 B2 * | 10/2004 | Spear et al. | 219/130.5 |
| 6,965,806 B2 * | 11/2005 | Eryurek et al. | 700/96 |
| 7,062,343 B2 * | 6/2006 | Ogushi et al. | 700/110 |
| 7,062,446 B1 * | 6/2006 | Suhy et al. | 705/1.1 |
| 7,124,059 B2 * | 10/2006 | Wetzer et al. | 702/184 |
| 7,162,394 B2 * | 1/2007 | Cheng et al. | 702/184 |
| 7,221,988 B2 * | 5/2007 | Eryurek et al. | 700/108 |
| 7,324,966 B2 * | 1/2008 | Scheer | 705/28 |
| 7,457,763 B1 * | 11/2008 | Garrow et al. | 705/7.24 |
| 8,266,066 B1 * | 9/2012 | Wezter et al. | 705/78 |
| 8,296,197 B2 * | 10/2012 | Avery et al. | 705/28 |
| 8,565,943 B2 * | 10/2013 | Weinmann et al. | 701/14 |
| 8,620,714 B2 * | 12/2013 | Williams et al. | 705/7.22 |
| 2002/0065698 A1 * | 5/2002 | Schick et al. | 705/8 |
| 2002/0077711 A1 | 6/2002 | Nixon et al. | |
| 2002/0143421 A1 * | 10/2002 | Wetzer | 700/100 |

(Continued)

OTHER PUBLICATIONS

Oxford English Dictionary (http://dictionary.oed.com/cgi/entry/50044093/50044093se...rd=collocated&first=1&max_to_show=10&hilite=50044093se1).*

(Continued)

*Primary Examiner* — Alan S Miller
(74) *Attorney, Agent, or Firm* — Arent Fox LLP

(57) ABSTRACT

A wireless equipment management system is provided which automatically orders parts in connection with equipment maintenance schedules generated using sensors remotely located with the equipment. The system additionally uses diagnostic software to analyze fault conditions within the equipment using the sensors, and parts are automatically ordered in conjunction with equipment service needs as determined by the system.

24 Claims, 3 Drawing Sheets

(56) References Cited

U.S. PATENT DOCUMENTS

| | | | |
|---|---|---|---|
| 2003/0036939 A1* | 2/2003 | Flores et al. | 705/8 |
| 2003/0055666 A1* | 3/2003 | Roddy et al. | 705/1 |
| 2003/0060949 A1* | 3/2003 | Letang et al. | 701/29 |
| 2003/0095038 A1* | 5/2003 | Dix | 340/425.5 |
| 2003/0101262 A1* | 5/2003 | Godwin | 709/224 |
| 2004/0039502 A1* | 2/2004 | Wilson et al. | 701/29 |
| 2004/0113761 A1* | 6/2004 | Borugian | 340/426.1 |
| 2004/0181368 A1* | 9/2004 | Breunissen et al. | 702/184 |
| 2005/0007249 A1 | 1/2005 | Eryurek et al. | |
| 2005/0086239 A1* | 4/2005 | Swann et al. | 707/100 |
| 2005/0131729 A1 | 6/2005 | Melby et al. | |
| 2005/0143956 A1* | 6/2005 | Long et al. | 702/184 |
| 2005/0240289 A1* | 10/2005 | Hoyte et al. | 700/49 |
| 2006/0273896 A1* | 12/2006 | Kates | 340/539.18 |
| 2006/0273918 A1* | 12/2006 | Ram et al. | 340/679 |
| 2007/0072547 A1* | 3/2007 | Sims et al. | 455/39 |

OTHER PUBLICATIONS

International Search Report—International Search Authority—PCT/US06/36577—Sep. 25, 2007 (1 page).

Written Opinion—PCT/US2006/36577, International Search Authority, European Patent Office, Sep. 25, 2007.

* cited by examiner

Fig. 2

| Equip ID | Year | Make | Model | Hours | Position (near Landmark) State | Mileage | Engine Maintenance Schedule | Alerts |
|---|---|---|---|---|---|---|---|---|
| 8650 | 2000 | Peterbilt | 379 | 1100 | 17.35 miles SSW of Escondido Park | 55,000 | Change Oil | |
| | | | | 2400 | | | Replace Fuel Mangt. Sesor | |
| | | | | 3600 | | | Routine Maintenance Schd. A | |
| | | | | 4800 | | | Routine Maintenance Schd. B | |

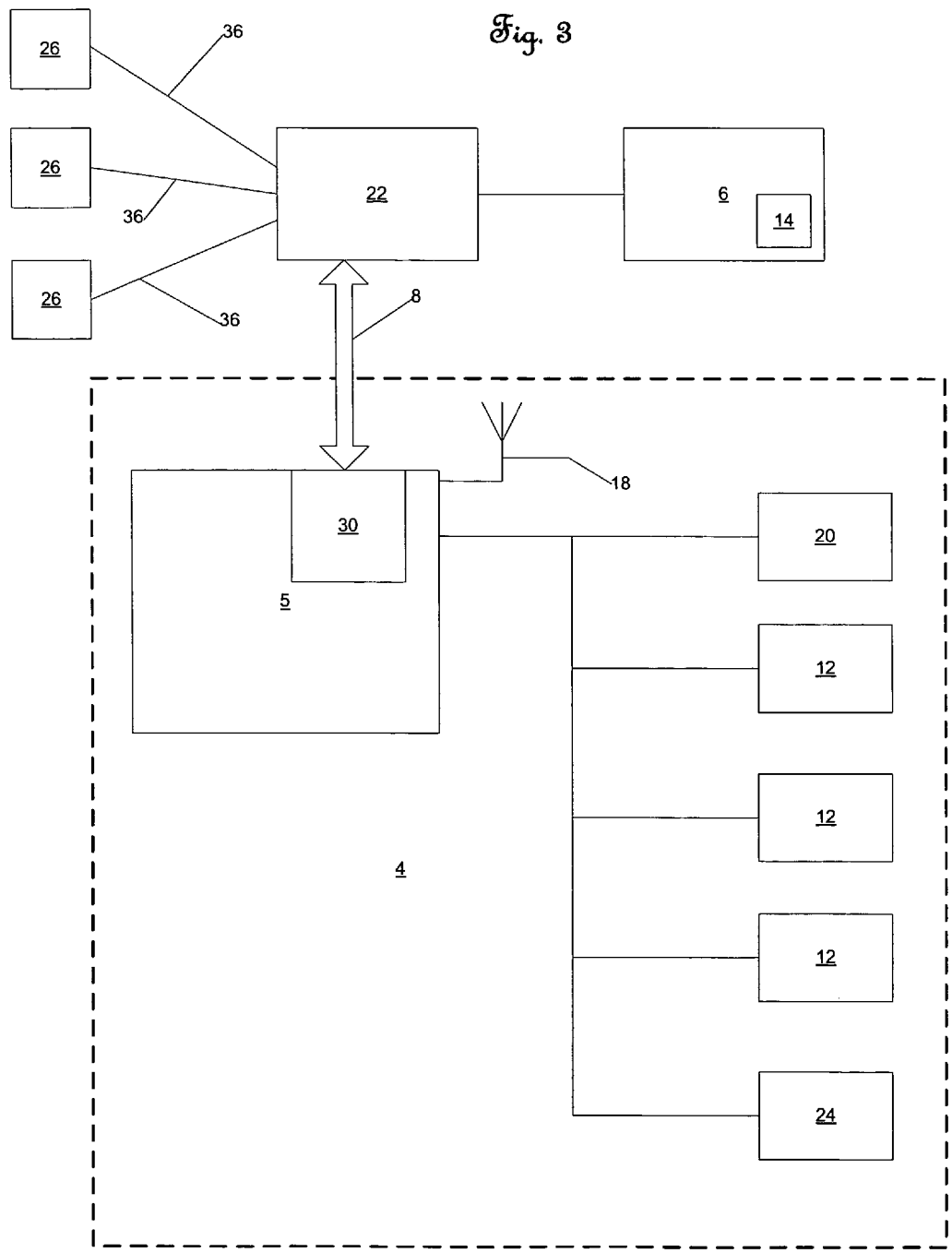

WIRELESS SYSTEM FOR AUTOMATIC ORDERING OF MAINTENANCE PARTS FOR EQUIPMENT

BACKGROUND OF THE INVENTION

Monitoring and managing equipment in remote locations presents a challenging task, particularly for construction equipment companies. This task becomes even more challenging when it involves mobile equipment such as heavy construction machinery. Creating maintenance schedules and the mechanisms by which the scheduling can be carried out can be complicated and time consuming.

Presently, systems are known which generate a single maintenance schedule for a piece of equipment. For instance, in the case of a piece of construction equipment, a single maintenance schedule is created for the entire machine. In cases where machines are located remote from the maintenance service center, generating maintenance schedules which are easily distributed and followed proved difficult until now.

Maintenance work can also involve the replacement of parts. However, until now, wireless systems which enable the automatic ordering of spare parts prior to a scheduled or unscheduled maintenance service for mobile equipment situated in the field did not exist.

BRIEF DESCRIPTION OF THE DRAWINGS

FIG. 2 illustrates a maintenance schedule as it pertains to a piece of monitored equipment, in this case, the engine of a Year 2000 Model 370 Peterbilt truck.

FIG. 3 is a block diagram illustrating how each sensor and/or controller on a piece of equipment is used to monitor or control a piece of equipment or system or function on a piece of equipment.

Figure 1:
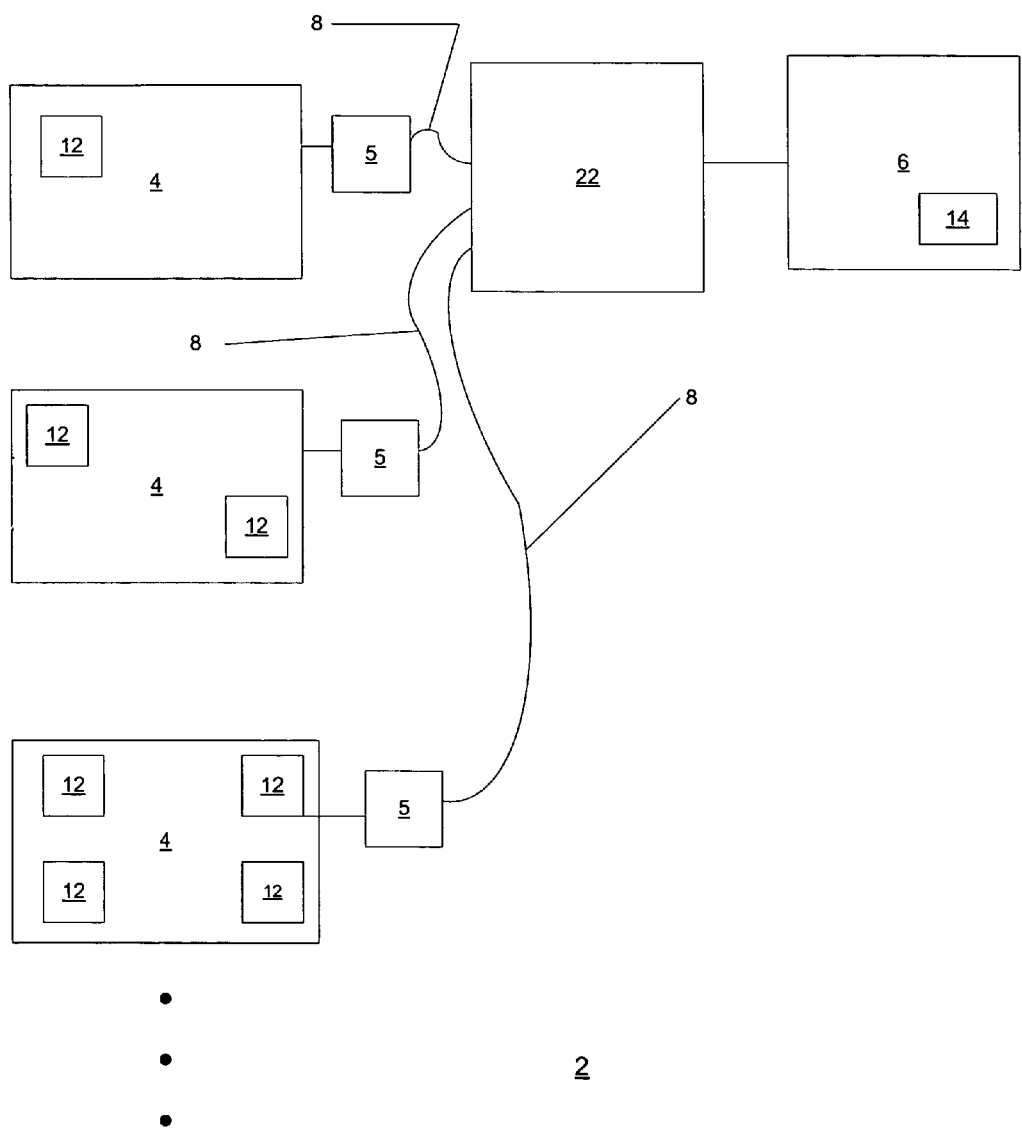
FIG. 1 illustrates a block diagram of an equipment management system.

Applicable reference numbers have been carried forward.

DETAILED DESCRIPTION

A wireless equipment management system 2 is provided for managing a plurality of equipment 4, e.g., mobile or non-mobile machines.

FIG. 1 illustrates a block diagram of equipment management system 2. FIG. 1 shows a plurality of monitored equipment 4 coupled to data processing center 6 through wireless communications link 8 represented by lines. Data processing center 6 is connected to system controller 22 which provides a communication hub among equipment 4, data processing center 6 and user control/monitoring sites (not shown). Equipment 4 can represent heavy equipment, office equipment, surface, land and air vehicles, etc. This includes engines, automobiles, trucks, construction, agricultural or earthmoving equipment, computers, consumer electronics, copiers, printers, facsimile machines, et cetera (communications link 8 can include a satellite data link, an analog cellular telephone communications link (using, for instance, frequency division multiple access (FDMA), a digital cellular communications link (using e.g., code division multiple access (CDMA), time division multiple access (TDMA), etc.) a radio link, Bluetooth, Wi-fi (802.11a, 802.11b, 802.11g etc.), or a combination thereof. Data processing center 6 receives status information related to monitored equipment 4. In one aspect, each monitored piece of equipment 4 can include one or more sensors 12 for measuring equipment usage or operating characteristics. In one embodiment, data processing center 6 receives signals, via communications link 8 from one or more sensors 12, containing data relating to equipment usage and/or operating characteristics. The received data is stored in memory at data processing center 6 which can adaptively manage maintenance scheduling for each piece of monitored equipment 4 based on data from sensors 12. For example, one of equipment 4 shown could represent an engine wherein a sensor 12 measures operating hours. Another sensor 12 can measure, for instance, ambient operating temperatures. An oil change schedule and an oil type can be calculated at data processing center 6 based upon the data supplied by sensors 12. For instance under predominantly and relatively high ambient temperatures, a higher weight oil and more frequent oil change scheduling at shorter operating hour intervals between scheduled oil changes may be prescribed to reduce engine wear. Predominantly cooler ambient temperatures over longer hour readings may dictate a lighter weight oil with more hours between oil changes. Consequently, an engine or piece of heavy equipment operating in area near the Sahara Desert in Africa could have an entirely different maintenance schedule from the same engine operating in Iceland as determined by processing center 6. Alternatively, in the case of a copier or facsimile machine sensor 12 can measure toner levels and copier usage hours to adaptively determine toner cartridge replacement scheduling and/or ordering.

Data processing center 6 includes one or more processors or one or more servers or computers including one or more processors which operate to run computer programs that manage and/or prepare equipment maintenance schedules for a plurality of equipment 4. Equipment operating data, historical usage data, maintenance schedules and equipment location information can also be tracked and maintained by one or more servers at data processing center 6.

Equipment manager 14 within data processing center 6 can be implemented as a server programmed to calculate servicing schedules for each monitored piece of equipment 4. Data on each monitored piece of equipment can be maintained in memory storage represented by functional block 6 as accomplished, for instance, in the same server as that for equipment manager 14 or in a separate server for storage of collected data. This data includes equipment specifications, and operating data including historical usage data. For instance, information relating to repair histories, in-service hours, fuel consumption, location information and operating costs can be stored in memory storage 16.

A particular advantage of wireless equipment management system 2 lies in its ability to generate multiple maintenance schedules that are independently, adaptively, and automatically driven from equipment information collected by sensors 12. Multiple schedules per equipment piece allow for easier tracking, initiation of new maintenance procedures and analysis. In the case of an engine, multiple schedules can be generated for oil changes, valve adjustment, component part replacement, etc. For the case of a construction machine, one or more sensors 12 can, for instance, monitor braking systems. One maintenance schedule can pertain to brake inspection and replacement of brake pads. Another schedule may pertain to track inspection and/or replacement, etc. It may be inconvenient or infeasible for an equipment manager or owner to handle certain maintenance procedures in-house. Typically, maintenance work for equipment in the field is outsourced to various specialty outfits. A tire contractor may handle all of the outsourced tire work for a company in a particular region or part of the world. Track maintenance may be contracted to a dealer. A single maintenance schedule for a piece of equipment can simply be insufficient, particularly in instances where maintenance work is contracted out or rather, outsourced. In order to assign and monitor the contracted work, a maintenance schedule for a particular type of maintenance work on a specific vehicle should be forwarded to a specific contractor, e.g. engine maintenance schedules for twenty machines identified as operating in Central America. Further, with an ever increasing eye toward security, an owner or manager of equipment may not want the entire maintenance schedule of a piece of equipment readily available to all that perform maintenance work. This may be especially the case with maintenance of security or military vehicles.

FIG. 2 illustrates a maintenance schedule as it pertains to a piece of monitored equipment, in this case, the engine of a Year 2000 Model 950G Caterpillar® Wheel Loader. Data can be displayed in a message, an electronic report etc. for dispatch to an entity monitoring equipment or directly to personnel responsible for providing maintenance service, e.g. engine servicing contractor. The data fields shown for display can be selected as required or desired. A similar schedule can be generated for other functions requiring servicing such as vehicle tire or vehicle transmission equipment.

Wireless equipment system 2 is preferably a computer-based system that uses the Transmission Control Protocol/Internet Protocol (TCP/IP) networking protocol. Further this system 2 is particularly suitable for the Internet, particularly with broadband Internet. Wireless system 2 is accessible from multiple sources concerning maintenance scheduling. Different levels of security can be meted out to each system user depending on information needs et cetera.

Wireless equipment system 2 can be implemented using a combination of wireless technology, data handling functionality construction industry constructs as provided, for example, by an equipment management solution such as GlobalTRACS® by QUALCOMM®. An equipment management solution automatically collects, organizes and transmits vital information concerning how the equipment is being used, how much equipment is being used as well as the location of that equipment. This information is especially useful to entities renting, distributing, contracting or owning equipment-particularly construction equipment. The equipment management solution can track equipment use such as engine hour use as reported by a sensor tracking usage hours of a system on a piece of equipment, such as an engine. Further, the equipment management solution can provide global positioning system (GPS)-based equipment location information including data indicating when a piece of equipment has moved outside of a pre-set boundary.

FIG. 3 is a block diagram illustrating how each sensor 12 and/or controller 20 on a piece of equipment is used to monitor or control a piece of equipment or system or function on a piece of equipment. Each sensor 12 and controller 20 on a piece of equipment 4 is connected through a controller area network (CAN). In one embodiment, each sensor 12 and controller 20 on the same piece of equipment can act as a CAN slave device connected to a CAN master controller 5. Master controller 5 includes antenna 18 which is used in connection with transmitting and receiving Code Division Multiple Access (CDMA) signals. However, other communications systems for use in connection with antenna 18 are contemplated, e.g., Time Division Multiple Access, et cetera.

Data received by each sensor 12 on a piece of equipment 4 is sent to CAN master controller 5 where it is stored until downloaded by system controller 22 through communications link 8.

Operator controller 24 receives alerts in the form of warning messages, instructions, alarms, etc. to warn an equipment operator (not shown) of conditions (faulty operation, etc.) sensed on equipment 4 by a sensor 12, thereby allowing the operator to take or institute corrective or preventative action.

Equipment manager 14 in conjunction with data processing center 6 analyzes data received from each CAN master controller 5. As a result thereof, equipment manager 14 issues, maintenance recommendations, alerts, alarms to system controller 22 which in turn forwards the same to a user control/monitoring site 26. A control/monitoring site 26 can represent, for instance, the owner of rental equipment. Through link 36, communications can be had between each control/monitoring site 26 and equipment manager 14 through system controller 22 pertaining to a specified piece of equipment 4. Communications over link 36 can occur by numerous ways. For instance, these communications can occur over the Internet, via e-mail, text messages, etc. Equipment manager 14 function can adapt to inputs, requests, etc. from control/monitoring sites 26. For instance, a maintenance step can be moved up ahead of schedule at the request of a control/monitoring site 26.

In another aspect, computers as represented by data processing center 6, are programmed according to software which, when wirelessly supplied with operating hours information, determines parts requirements in connection with Original Equipment Manufacturer (OEM) maintenance scheduling for a particular piece of equipment. Further, this software determines OEM parts ordering requirements necessary to fulfill completion of scheduled maintenance and/or emergency servicing using historical data. Inventory control, pursuant to parts ordering, can be accomplished in a number of ways using production control methodologies which coordinate parts ordering for more than one piece of equipment. Additionally, parts are ordered automatically from OEMs for components specific to a given piece of equipment according to programming of computers at processing center 6. Preferably, this automatic parts ordering occurs through use of the Internet.

Automatic parts ordering can be accomplished using physical linking wherein maintenance scheduling for pieces of equipment is synchronized. The same routine maintenance is performed simultaneously on all equipment of a same or similar type located at the same or proximate location. Consequently, parts needed to fulfill scheduled maintenance are ordered for all equipment at a co-location requiring maintenance.

In another embodiment, a kanban inventory control process is used in conjunction with ordering parts pursuant to maintenance work on equipment. "Kan" means card and "ban" means signal in Japanese. In a manufacturing setting, a component lot is provided with a card that is delivered to a component manufacturing or supply point in a factory upon exhaustion of the component inventory. The card "signals" production or reordering of a component lot to be provided to the factory area in need of the component part in the manufacturing process. A new lot of components is not made or reordered until the card is received. This is a simple example of kanban.

Kanban provides inventory on a just-in-time basis. It is particularly useful in instances of providing inventory of varying lot sizes and when distance introduces time lag or variability.

Pursuant to implementing a kanban methodology, hardware representing data processing center 6 is programmed according to kanban software that determines which parts are suitable for kanban reordering. Items of varying lot sizes are best suited for kanban reordering. Data processing center 6 also selects parts suppliers and determines parts costs. In a further aspect as a consequence of the kanban programming of data processing center 6, the mode of transportation of spare parts and the stockpoints of storage of spare parts is determined. The goal of kanban, i.e. just in time delivery, are adhered to in making the various selections concerning parts suppliers, stockpoints, mode of transportation etc. In addition to the above, the kanban programming allows data processing 6 to optimally determine the intitial quantities of spare parts to be ordered and maintained on-hand in inventory.

Since maintenance is a consequence of a nondeterministic system, e.g. spare parts needs have probabilities other than 0 or 1, there may be instances of equipment malfunctions that are unpredictable. Consequently, necessary spare parts may not be in inventory sufficient to coincide with a repair after a diagnosis of an equipment problem. Since sensors are contemplated as being placed on equipment at selected locations, it is contemplated that equipment diagnostics can be run remotely. For instances, engine diagnostic equipment at a remote location can be obtained, using wireless communications, through sensors 12. Alternatively, computers representative of data processing center 6 can be programmed according to diagnostic software. For instance, computers representative of data processing center 6 can run engine diagnostic software. Further, it is contemplated that the diagnostic programming will enable the determination of which parts of a piece of equipment need replacement.

According to one embodiment, data processing center 6 will electronically order spare parts as determined in connection with equipment diagnostic programming before, after, or during equipment breakdown or malfunction. Consequently, spare parts needed for just-in-time delivery can be made to occur to coincide with the arrival of service personnel at the site of the equipment needing service and parts replacement as determined in advance through diagnostics run remotely. This embodiment can be carried out particularly with respect to a CDMA system wherein high speed data traffic is supported in connection with allocating bandwidth on supplemental channels (SCH) for high data rate. Since communication between the equipment and equipment management system 2 uses TCP/IP, data from a TCP server (not shown) and the equipment can be carried out by a CDMA network using a Data Link layer according to the radio link protocol for added reliability.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A management system for a plurality of equipment, comprising:
   a processor operable to receive, via a wireless communication system, location data pertaining to a plurality of equipment located remotely from the processor and operating condition information from at least one sensor on each of the plurality of equipment that senses the operating condition information of the equipment;
   the processor being further operable to:
      determine, based on the location data, equipment of the plurality of equipment that is located proximate to a location;
      determine, based on each operating condition information, maintenance work for each of the equipment that is located proximate to the location;
      determine a subset of similar type of equipment of the equipment located proximate to the location;
      determine a maintenance schedule for the equipment having synchronized maintenance work for the subset of similar type of equipment; and
      synchronize ordering parts electronically for the equipment that is located proximate to the location in connection with the maintenance schedule and the maintenance requirements work.

2. The management system as recited in claim 1, wherein the operating condition information comprises equipment maintenance historical data.

3. The management system as recited in claim 2, further comprising a data storage memory operable to store equipment maintenance historical data for the plurality of equipment.

4. The management system as recited in claim 1, wherein said parts are identified for replacement and ordered over the Internet.

5. The management system as recited in claim 1, wherein the maintenance work pertains to maintenance of one from the group consisting of power trains, engines, hydraulic systems and transmissions.

6. The management system as recited in claim 1, wherein the wireless communications system is selected from the group consisting of a Code Division Multiple Access (CDMA) communications system, a Time Division Multiple Access (TDMA) system, a Frequency Division Multiple Access System (FDMA), a satellite communications system and a two-way radio communications system.

7. The management system as recited in claim 1,
   wherein the processor is further operable to:
      receive equipment operation hours from the at least one sensor;
      generate multiple maintenance schedules for each piece of the equipment that is located proximate to the location based on the equipment operation hours;
      dispatch the multiple maintenance schedules for each piece of equipment;
      issue a maintenance recommendation for each piece of equipment; and
      electronically order parts for the equipment that is located proximate to the location based on the multiple maintenance schedules, wherein the parts ordered are determined in connection with a predetermined original equipment manufacturer (OEM) maintenance schedule for the equipment.

8. The management system as recited in claim 7, wherein a maintenance schedule from said multiple maintenance schedules pertains to maintenance of one from the group consisting of power trains, engines, hydraulic systems and transmissions.

9. The management system as recited in claim 7, wherein the wireless communications system is selected from the group consisting of a Code Division Multiple Access (CDMA) communications system, a Time Division Multiple Access (TDMA) system, a Frequency Division Multiple Access System (FDMA), a satellite communications system and a two-way radio communications system.

10. The management system as recited in claim 1,
   wherein the processor is further operable to:
      analyze equipment malfunction according to equipment diagnostic software and the operating condition information;
      dispatch a maintenance schedule for the equipment based on the analyzed equipment malfunction;
      issue an alert indicating the equipment malfunction; and electronically order parts for the equipment that is located proximate to the location in connection with the maintenance schedule, wherein the parts ordered are determined in connection with a predetermined original equipment manufacturer (OEM) maintenance schedule for the equipment.

11. The management system as recited in claim 10, wherein the wireless communications system is selected from the group consisting of a Code Division Multiple Access (CDMA) communications system, a Time Division Multiple Access (TDMA) system, a Frequency Division Multiple Access System (FDMA), a satellite communications system and a two-way radio communications system.

12. The management system of claim 1, further comprising:
issuing an alert for the equipment, wherein the alert is selected from the group consisting of a warning message, an instruction, and an alarm.

13. The management system of claim 7, wherein the multiple maintenance schedules for each piece of equipment are independent from other pieces of equipment at the location.

14. The management system of claim 7, wherein parts for equipment of the same type are ordered simultaneously based on the maintenance schedules for the equipment.

15. The management system of claim 10, wherein the alert is selected from the group consisting of a warning message, an instruction, and an alarm.

16. The management system of claim 1, wherein the processor is further operable to:
adaptively manage the maintenance schedule based on normal operating conditions and environmental conditions of the equipment located proximate to the location.

17. The management system of claim 16, wherein the environmental conditions include high ambient temperatures; and
wherein the maintenance schedule includes using higher weight oil and more frequent oil change scheduling at shorter operating hour intervals.

18. The management system of claim 16, wherein the environmental conditions include cool ambient temperatures over longer hour readings; and
wherein the maintenance schedule includes using a lighter weight oil and more hours between oil changes.

19. A management system for a plurality of equipment, comprising:
means for receiving location data pertaining to a plurality of equipment and operating condition information from at least one sensor on each of the plurality of equipment that senses the operating condition information of the equipment;
means for determining, based on the location data, equipment of the plurality of equipment that is located proximate to a location;
means for determining, based on each operating condition information, maintenance work for each of the equipment that is located proximate to the location;
means for determining a subset of similar type of equipment of the equipment located proximate to the location;
means for determining a maintenance schedule for the equipment having synchronized maintenance work for the subset of similar type of equipment;
means for synchronizing ordering parts electronically for the equipment that is located proximate to the location in connection with the maintenance schedule and the maintenance work.

20. The management system of claim 19, further comprising:
means for receiving equipment operation hours from the at least one sensor;
means for generating multiple maintenance schedules for each piece of the equipment that is located proximate to the location based on the equipment operation hours;
means for dispatching the multiple maintenance schedules for each piece of equipment;
means for issuing a maintenance recommendation for each piece of equipment; and
means for electronically ordering parts for the equipment that is located proximate to the location based on the maintenance schedule, wherein the parts ordered are determined in connection with a predetermined original equipment manufacturer (OEM) maintenance schedule for the equipment.

21. The management system of claim 19, further comprising:
means for analyzing equipment malfunction according to equipment diagnostic software and the operating condition information;
means for dispatching a maintenance schedule for the equipment based on the analyzed equipment malfunction;
means for issuing an alert indicating the equipment malfunction for the equipment; and
means for electronically ordering parts for the equipment that is located proximate to the location in connection with the maintenance schedule, wherein the parts ordered are determined in connection with a predetermined original equipment manufacturer (OEM) maintenance schedule for the equipment.

22. A computer program product, comprising:
a non-transitory computer-readable medium comprising:
at least one instruction for causing a computer to receive location data pertaining to a plurality of equipment and operating condition information from at least one sensor on each of the plurality of equipment that senses the operating condition information of the equipment;
at least one instruction for causing the computer to determine, based on the location data, equipment of the plurality of equipment that is located proximate to a location;
at least one instruction for causing the computer to determine, based on each operating condition information, maintenance work for each of the equipment that is located proximate to the location;
at least one instruction for causing the computer to determine a subset of similar type of equipment of the equipment located proximate to the location;
at least one instruction for causing the computer to determine a maintenance schedule for the equipment having synchronized maintenance work for the subset of similar type of equipment; and
at least one instruction for causing the computer to synchronize ordering parts for the equipment that is located proximate to the location in connection with the maintenance schedule and the maintenance work.

23. The computer program product of claim 22, further comprising:
at least one instruction for causing the computer to receive equipment operation hours from the at least one sensor;
at least one instruction for causing the computer to generate multiple maintenance schedules for each piece of the equipment that is located proximate to the location based on the equipment operation hours;

at least one instruction for causing the computer to dispatch the multiple maintenance schedules for each piece of equipment;

at least one instruction for causing the computer to issue a maintenance recommendation for each piece of equipment; and at least one instruction for causing the computer to order parts for the equipment that is located proximate to the location based on the multiple maintenance schedules, wherein the parts ordered are determined in connection with a predetermined original equipment manufacturer (OEM) maintenance schedule for the equipment.

24. The computer program product of claim 22, further comprising:

at least one instruction for causing the computer to analyze equipment malfunction according to equipment diagnostic software and the operating condition information;

at least one instruction for causing the computer to dispatch a maintenance schedule for the equipment based on the analyzed equipment malfunction;

at least one instruction for causing the computer to issue an alert; and at least one instruction for causing the computer to order parts for the equipment that is located proximate to the location in connection with the maintenance schedule, wherein the parts ordered are determined in connection with a predetermined original equipment manufacturer (OEM) maintenance schedule for the equipment.

\* \* \* \* \*